Patented Apr. 6, 1937

2,075,963

UNITED STATES PATENT OFFICE 2,075,963

METHOD OF OBTAINING HIGHER MOLECULAR ALCOHOLS

Walther Schrauth, Berlin-Dahlem, Germany, assignor, by mesne assignments, to "Unichem" Chemikalien Handels A.-G., Zurich, Switzerland, a corporation of Switzerland No Drawing. Application May 7, 1932, Serial No. 609,991

3 Claims. (Cl. 260—156)

The present invention relates to improvements in processes for obtaining higher molecular alcohols and has for its principal object to provide a process affording a high yield of these alcohols from raw materials.

A further object is to provide a more effective and commercially profitable process for obtaining these alcohols.

A still further object is to provide a process for producing separately different alcohols from one source.

A still further object is to provide a process yielding relatively homogeneous alcohols in each of separate fractions as produced.

The present invention has been evolved more particularly in connection with the development of a process for producing separately cetyl alcohol and oleyl alcohol from sperm oil or whale oil and for convenience will be more particularly described in relation to its application to the treatment of this oil, but it will be understood that the particular description is illustrative merely and is not intended as defining the limits of the invention.

I have discovered that it is possible to first separate sperm oil into fractions and then separately to produce from one fraction mainly cetyl alcohol and from the other fraction mainly oleyl alcohol.

In accordance with the invention the sperm oil or the like containing a mixture of esters, is chilled to a separating temperature, in the case of sperm oil about 10° C., or lower and then separated by filtration into two fractions. The solid fraction of sperm oil forming the filter cake consists largely of esters of cetyl alcohol and palmitic or cetylic acid and constitutes about 30–40%. The liquid fraction of sperm oil forming the filtrate consists largely of esters of oleyl alcohol and oleic acid and constitutes 60 to 70% of the original sperm-oil content. There are also present in both fractions small percentages of other closely related esters. The alcohol may be produced from the solid and liquid fractions respectively, either by saponification and distillation or by reduction through the use of sodium and a lower molecular alcohol, such as butyl alcohol according to Bouveault process. ("Die Methoden der organischen Chemie" 1925.)

If the solid fraction from the chilled sperm oil is saponified, it is converted into cetyl alcohol and palmitic soap and cetyl alcohol, amounting to 12 to 15% of the original sperm oil, can be separated by distillation from the palmitic soap, which amounts to approximately 25% of the original sperm oil. If the liquid portion of the sperm oil is saponified, the oleyl alcohol may be distilled from the oleic acid soap and constitutes about 25% of the original sperm oil. When the oleyl alcohol is obtained from the sperm oil by saponification and distillation, it will be found to contain traces of cetyl alcohol and possibly other saturated alcohols which causes it to solidify on chilling at comparatively high temperatures and gives it a low iodine number of approximately 50 to 60, as compared with about 85 to 90 for oleyl alcohol. If the liquid portion of the sperm oil is, however, reduced to alcohol by the use of the Bouveault process using, for example sodium and butyl alcohol, a higher yield of oleyl alcohol constituting about 80% of the liquid fraction of the sperm oil can be obtained. This oleyl alcohol as obtained by the sodium process is substantially free from cetyl alcohol or other saturated alcohols and has high iodine values, approximately 80 to 90, and a lower solidification point on chilling.

The foregoing particular description is illustrative but variations in the procedure and application of the invention may be made without departing from the scope of the claims.

I claim:

1. The method of producing unsaturated alcohol having an iodine number approximating 85 to 90 which comprises chilling sperm oil to approximately 10° C. to provide solid and liquid fractions, separating the liquid fraction and reducing it with sodium and a low molecular alcohol according to the Bouveault process to produce high molecular unsaturated alcohol.

2. The method of producing oleyl alcohol from sperm oil which comprises chilling the oil to 10° C. or lower to provide solid and liquid fractions, separating the liquid fraction and reducing it with sodium and a low molecular alcohol according to the Bouveault process to break up the esters and also to reduce the acid constituents to alcohol.

3. The method of producing oleyl alcohol from sperm oil which comprises chilling the oil to approximately 10° C. to provide solid and liquid fractions, separating the liquid fraction and reducing it with sodium and butyl alcohol to break up the esters and also to reduce the acid constituents to alcohol to produce a yield of alcohol approximating 80% of the liquid fraction.

WALTHER SCHRAUTH.